United States Patent [19]
Imai et al.

[11] Patent Number: 5,564,746
[45] Date of Patent: Oct. 15, 1996

[54] PRELOADER FOR WEBBING RETRACTOR

[75] Inventors: Keisuke Imai; Mitsuyoshi Ohno; Toshihito Miyagawa, all of Aichi-ken, Japan

[73] Assignee: Kabushiki Kaisha Tokai-Rika-Denki-Seisakusho, Aichi-ken, Japan

[21] Appl. No.: 145,097

[22] Filed: Nov. 3, 1993

[30] Foreign Application Priority Data

Nov. 6, 1992  [JP]  Japan ................. 4-076648 U

[51] Int. Cl.⁶ ..................................... B60R 22/46
[52] U.S. Cl. ................. 280/806; 280/734; 297/480
[58] Field of Search ................... 280/806, 731, 280/734; 297/480, 470, 471, 474

[56] References Cited

U.S. PATENT DOCUMENTS

| | | |
|---|---|---|
| 4,955,638 | 9/1990 | Kinoshita et al. . |
| 5,039,125 | 8/1991 | Burna et al. ............... 280/731 |
| 5,092,628 | 3/1992 | Tamura et al. ............ 280/731 |
| 5,129,680 | 7/1992 | Mori .......................... 280/806 |

FOREIGN PATENT DOCUMENTS

| | | |
|---|---|---|
| 335853 | 8/1991 | Japan . |
| 3121958 | 12/1991 | Japan . |
| 2220128 | 1/1990 | United Kingdom . |
| 2272148 | 5/1994 | United Kingdom ............ 280/806 |

*Primary Examiner*—Eric D. Culbreth
*Attorney, Agent, or Firm*—Sixbey, Friedman, Leedom & Ferguson, PC; Thomas W. Cole

[57] ABSTRACT

A preloader for a webbing retractor, having a safety device which can be selectively switched to one of an operative state in which a sensor, which detects the state of rapid deceleration of a vehicle, is brought to a non-detecting state, and an operation-released state in which the sensor is brought to a detecting state. The safety device, when in the operative state, interferes with a vehicle component to be mounted after installation of the webbing retractor to a vehicle body and prevents the vehicle component from being mounted to the vehicle body and allows, when in the operation-released state, the mounting of the vehicle component to the vehicle body. Accordingly, an operator can easily determine whether the safety device is in the operative state or in the operation-released state.

14 Claims, 3 Drawing Sheets

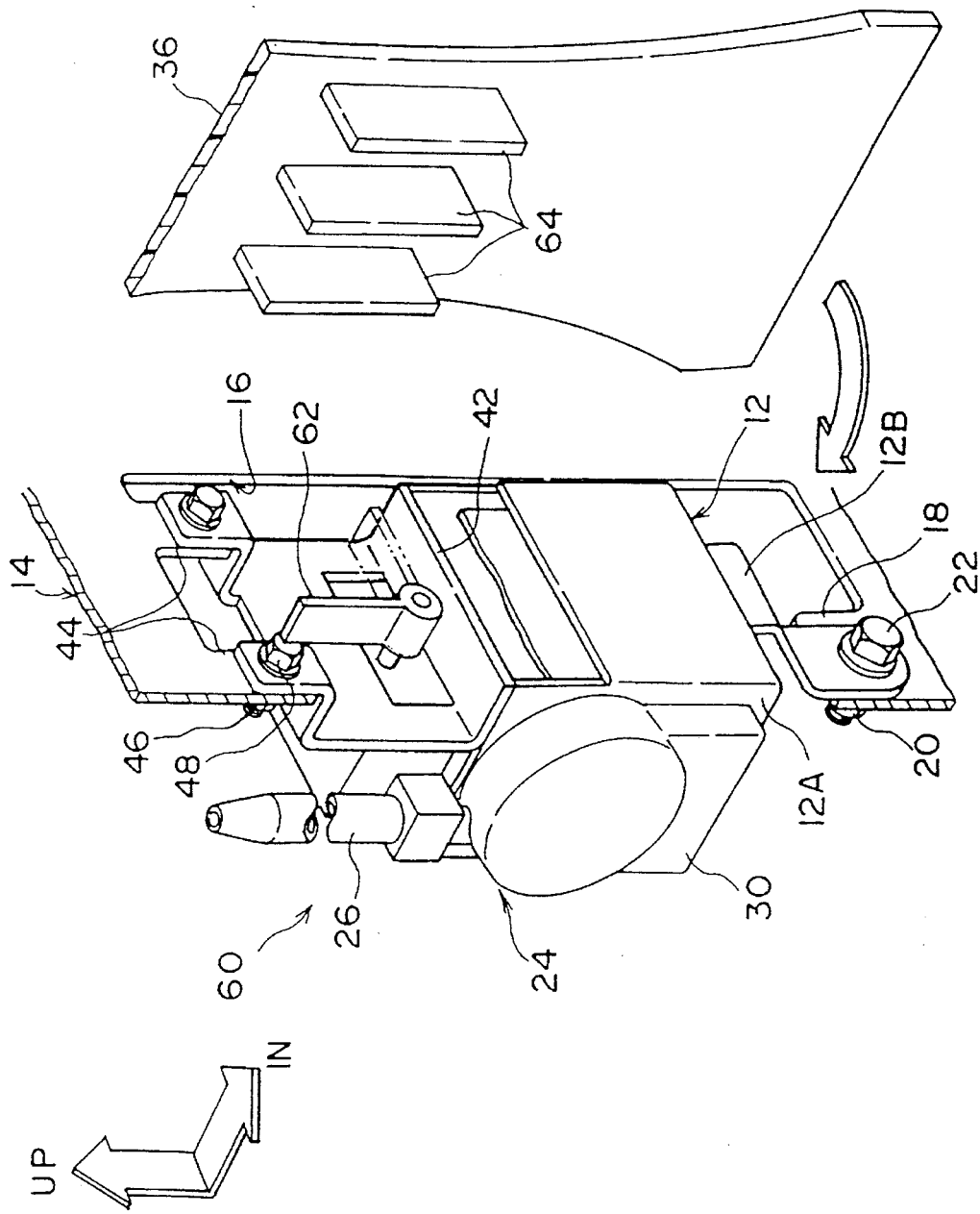

PRELOADER FOR WEBBING RETRACTOR

BACKGROUND OF THE INVENTION

FIELD OF THE INVENTION

The present invention relates to a preloader for use in a webbing retractor and adapted to quickly and instantaneously rotate a winding shaft in a direction of winding a webbing at the time of a sudden deceleration of a vehicle, and particularly to a safety device of the same.

DESCRIPTION OF THE RELATED ART

Conventionally, a webbing retractor has been employed, which has a preloader which quickly and instantaneously rotate a winding shaft in a direction of winding a webbing at the time of a sudden deceleration of a vehicle. In general, this type of preloader is provided with a safety device which activates a preloader sensor only when needed. This safety device is adapted to render the preloader sensor in a non-operative state when the webbing retractor is mounted to the vehicle body and the webbing retractor is removed therefrom and to render the preloader sensor in an operative state when the mounting of the webbing retractor to the vehicle body has been completed and operation of the safety device has been released (see, for example, Japanese Utility Model Application Laid-Open No. 3-121958 (1991)).

In the prior art disclosed in this publication, a mounting bolt used for fixing a frame of a webbing retractor to a side wall of a vehicle body is threadedly inserted into a nut. An end portion of the mounting bolt causes a lever to rotate, so that the safety device of the preloader is switched from an operative state to an operation-released state (i.e., a state in which operation of the safety device is released), thereby allowing the alternation of the preloader sensor from a non-detecting state (i.e., a state in which the sensor cannot detect the state of quick vehicle speed deceleration) to a detecting state (i.e., a state in which the sensor can detect the state of quick vehicle speed deceleration).

However, since the prior art disclosed in this publication is constructed such that a mounting bolt is threadedly inserted from the side of a vehicle interior by an operator and at the same time, the safety device of the preloader is switched from an operative state to an operation-released state, there exists problems in that it is not easy for the operator to determine whether the safety device has been reliably switched from an operative state to an operation-released state by the mounting bolt. Namely, when the process of inserting the mounting bolt has been completed, the aforementioned lever is positioned at the inner side of the side wall of the vehicle body when seen from the operator's side. For this reason, the operator positioned in front of the side wall of the vehicle body (i.e., at the side of the vehicle interior of the side wall) cannot easily see the lever. Accordingly, it is not easy for the operator to determine whether the safety device is reliably switched from an operative state to an operation-released state.

SUMMARY OF THE INVENTION

With the aforementioned facts in view, it is an object of the present invention to provide a preloader for a webbing retractor, which allows the operator to easily determine whether the safety device is in an operative state or an operation-released state.

In accordance with the present invention, there is provided a preloader for a webbing retractor having a winding shaft which winds an occupant restraining webbing in layers and which quickly rotates the winding shaft in the direction of winding the webbing by a predetermined amount at the time of a sudden deceleration of the vehicle, the preloader comprising: a sensor which detects a state in which the vehicle rapidly decelerates; and a safety device which can be selectively switched to one of an operative state in which the sensor is brought to a non-detecting state and an operation-released state in which the sensor is brought to a detecting state, and being characterized in that the safety device, when in the operative state, interferes with a vehicle component to be mounted after installation of the webbing retractor to the vehicle body and prevents the vehicle component from being mounted to the vehicle body and when in the state in which the operation of the safety device is released, the safety device allows the mounting of the vehicle component to the vehicle body.

According to the above construction of the present invention, when the safety device is in the operative state, the safety device interferes with the vehicle component to be mounted after installation of the webbing retractor to the vehicle body, thereby preventing the vehicle component from being mounted to the vehicle body. When considered in the reverse order, when the vehicle component is mounted to the vehicle body by an operator after the installation of the webbing retractor to the vehicle body, it becomes clear that the safety device is in the operative state supposing that the mounting of the vehicle component is prevented.

Meanwhile, when the safety device is in the operation-released state, the vehicle component can be mounted to the vehicle body. When considered in the reverse order, when the vehicle component is mounted to the vehicle body, it becomes clear that the safety device is in the operation-released state.

Accordingly, the operator can easily determine by means of the vehicle component whether the safety device is in the operative state or in the operation-released state.

As described above, the preloader for a webbing retractor according to the present invention attains an excellent effect in that an operator can easily determine whether a safety device is in an operative state or in an operation-released state.

BRIEF DESCRIPTION OF THE DRAWINGS

FIG. 3 is a perspective view illustrating a webbing retractor according to a third embodiment of the present invention, the view corresponding to FIG. 2.

DESCRIPTION OF THE PREFERRED EMBODIMENTS

Figure 1:
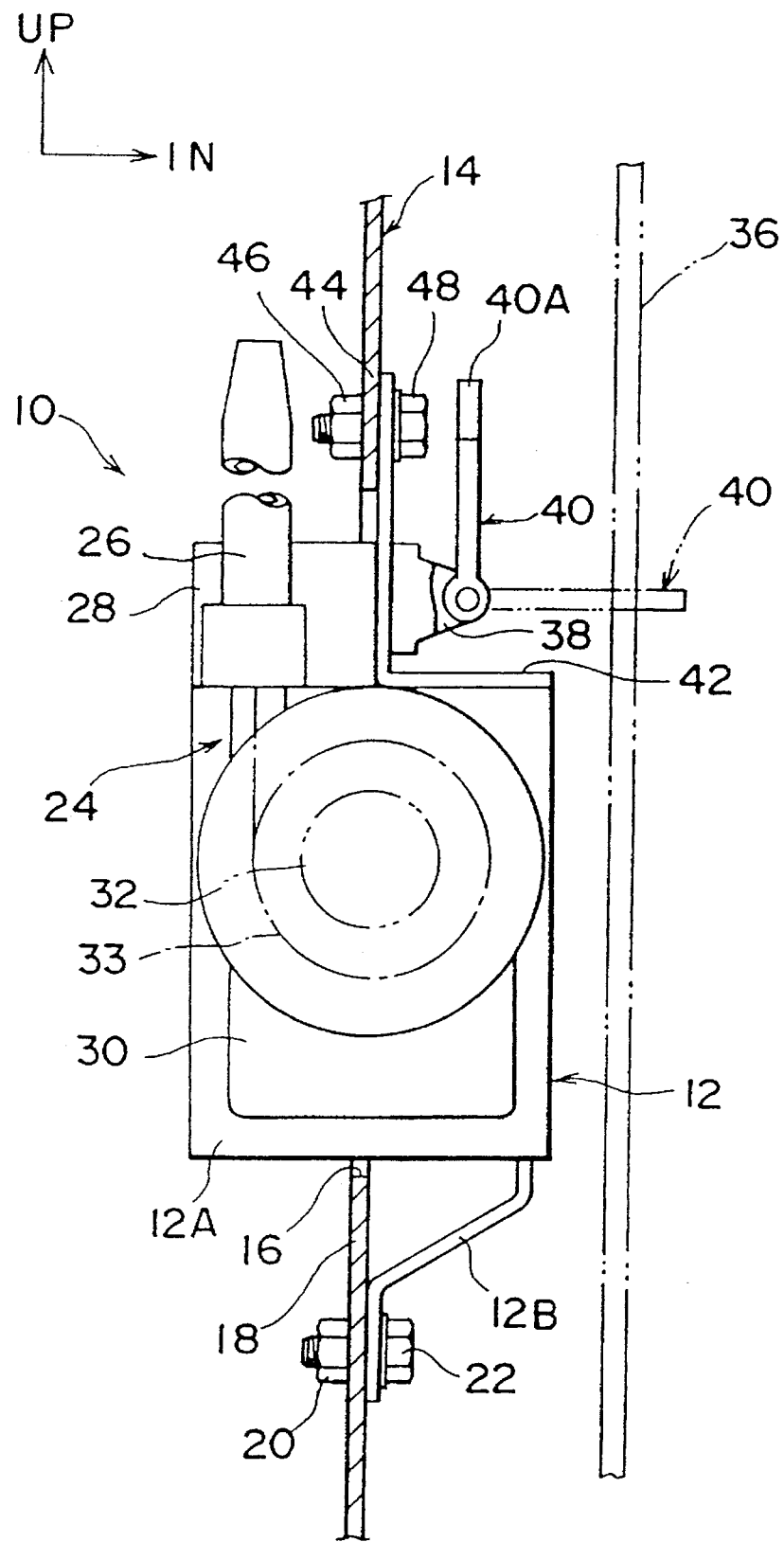
FIG. 1 is a side view illustrating a webbing retractor according to a first embodiment of the present invention.

Referring now to FIG. 1, a webbing retractor 10 according to a first embodiment of the present invention will be described below.

FIG. 1 illustrates an external side view of the webbing retractor 10. Note that arrows "UP" and "IN" shown in the accompanying drawings, respectively represent an upward direction of a vehicle and an inward direction thereof relative to a transverse axis of the vehicle.

The webbing retractor 10 is provided with a U-shaped frame 12 having a pair of leg plates 12A whose lateral surfaces are in parallel with each other. A mounting flange 12B is integrally formed with the frame 12 at an intermediate portion thereof. The mounting flange 12B extends in a downward direction of the vehicle. Further, an opening portion 16 having a substantially rectangular shape is formed in the bottom portion of a side wall 14 of the vehicle body. The side wall 14 includes a mounting flange 18 and a bifurcated mounting flange 44. In the center of the lower edge of the opening portion 16, the mounting flange 18 extending in an upward direction of the vehicle is integrally formed with the opening portion 16. A weld nut 20 is in advance welded to the surface of the mounting flange 18 at the vehicle exterior side in advance.

Further, an L-shaped upper stay 42 is fixed to an upper end portion of the frame 12. An unillustrated bolt-inserting through hole is formed in an upper end portion of the upper stay 42. Meanwhile, in the center of the upper edge of the opening portion 16 of the side wall 14 of the vehicle body, the bifurcated mounting flange 44 extending in a downward direction of the vehicle is integrally formed with the opening portion 16. A weld nut 46 is welded to the surface of the mounting flange 44 at the vehicle exterior side in advance.

Therefore, when the webbing retractor 10 is mounted to a bottom portion of the side wall 14 of the vehicle body, the webbing retractor 10 passes through the opening portion 16 and simultaneously the mounting flange 12B and the upper stay 42 of the frame 12, and the mounting flange 18 and the mounting flange 44 of the opening portion 16 are securely fixed to each other. After that, the mounting bolts 22, 48 threadedly engage the weld nuts 20, 46, respectively. It should be noted that this fixing operation may be carried out by means of, e.g., a jig such as an impact wrench.

A preloader 24 is provided on one leg plate 12A of the webbing retractor 10. A brief description will be given of the structure of the preloader 24. The preloader 24 is provided with a cylinder 26, a sensor-accommodating section 28, and a case 30.

Within the case 30, an unillustrated rotating drum is provided which is integrally formed at an end portion of a winding shaft 32. An annular groove is formed on an outer peripheral portion of the rotating drum. Three wedge members formed by dividing a ring-shaped member in a circumferential direction thereof into three portions, are disposed in the annular groove. These wedge members are respectively supported by shear pins which are formed in and extend from the leg plate 12A. Usually, the wedge members are spaced apart from the rotating drum. On the outer peripheral portion of these wedge members, a wire 33 of which one end is coupled to a piston accommodated in the cylinder 26 is wound around somewhat loosely. The other end of the wire 33 is engaged with one of the wedge members.

Meanwhile, within the sensor-accommodating section 28, an unillustrated mechanical ignition sensor which operates at the time of a sudden deceleration of the vehicle, a blasting cap which is ignited by the operation of the sensor, a booster which combusts by a spark from the blasting cap, a gas-generating agent, and the like are contained.

The aforementioned sensor, having a conventional structure, is comprised of a ball which inertially moves at the time of a sudden deceleration of the vehicle, a drive shaft which swings as a result of the inertial movement of the ball, a bias spring which urges the ball in the direction opposite to that of the inertial movement via a bias pin held in contact with the drive shaft, an ignition pin engaged with the drive shaft and removed therefrom by causing the drive shaft to swing so as to move toward the blasting cap by an urging force, and other components. The sensor is constructed such that, when the sensor detects the rapid deceleration of the vehicle, the gas-generating agent combusts, and gas is generated so that the piston is pushed upwardly toward the leading end of the cylinder 26. When the piston moves upwardly, the wire 33 tightens the wedge members to the side of an axial center of the rotating drum. When the tightening force of the wire comes to a specified value, the shear pins are sheared and the wedge members are sunk into the shaft core of the rotating drum. As a result, the rotating drum and the winding shaft 32 disposed coaxial therewith rotate together in the direction of winding a webbing.

On the other hand, a lever 40, serving as a safety device, is rotatably disposed via a bracket 38 on a surface of the aforementioned sensor-accommodating section 28 at the side of a vehicle interior. The lever 40 is adapted to be held in a vertical state (indicated by the solid line in FIG. 1) and a horizontal state (indicated by the two-dot chain line in FIG. 1) by snap action. When the lever 40 is in a vertical state, the sensor is capable of detecting. Namely, this state of the lever 40 indicates an operation-released state of the safety device. Meanwhile, when the lever 40 is in a horizontal state (indicated by the two-dot chain line in FIG. 1), the sensor is in a non-detecting state. Namely, this state of the lever 40 indicates an operative state of the safety device.

Further, a garnish 36 made from resin and serving as a vehicle component, is mounted to the inner surface of the side wall 14 of the vehicle body, to which the webbing retractor 10 is mounted. The garnish 36 is adapted to not interfere with the lever 40 when the lever 40 is in a vertical state and to interfere with the end portion 40A of the lever 40 when the lever 40 is in a horizontal state. Meanwhile, when the lever 40 is in a vertical state, the end portion 40A of the lever 40 causes a bolt-inserting through hole (a head portion of the mounting bolt 48) of the upper stay 42 not to be seen from the side of the vehicle interior.

The operation of the present embodiment will be described below with reference to the sequence of mounting and removing the webbing retractor 10 and the garnish 36.

Initially, since the mounting bolt 48 cannot be tightened when the lever 40 is in a vertical state, the operator first brings the lever 40 to a horizontal state before the mounting flange 12B and the upper stay 42 of the frame 12 of the webbing retractor 10, and the mounting flanges 18, 44 of the opening portion 16 of the side wall 14 of the vehicle body are respectively positioned. After that, the mounting bolts 22, 48 are threadedly engaged with the weld nuts 20, 46, respectively, by using an impact wrench or the like. As a result, the webbing retractor 10 is mounted to the bottom portion of the side wall 14 of the vehicle body.

In this case, since the lever 40 is in a horizontal state (i.e., the safety device is in an operative state), the sensor is set to be in a non-detecting state. Accordingly, the mounting operation of the webbing retractor 10 to the side wall 14 of the vehicle body can be safely and reliably achieved.

Next, the garnish 36 is mounted to the surface of the side wall 14 of the vehicle body at the side of the vehicle interior by an unillustrated fixing means. In this case, if the garnish 36 is mounted in the state in which the lever 40 is disposed horizontally, the end portion 40A of the lever 40 interferes with the garnish 36. Therefore, the operator can easily understand that the lever 40 (the safety device) is in an operative state (i.e., the sensor is in a non-detecting state) and switches the lever 40 from a horizontal state to a vertical state (i.e., the safety device is in an operation-released state) prior to installation of the garnish 36. Accordingly, the sensor is capable of detecting. After that, the garnish 36 is mounted to the surface of the side wall 14 of the vehicle body at the side of the vehicle interior.

After the aforementioned installation has been completed, at the time of a sudden deceleration of the vehicle, the sensor detects the rapid deceleration of the vehicle and a gas is generated, thereby causing the piston to be pushed upwardly toward the leading end of the cylinder 26. For this reason, the tightening force of the wire 33 causes the shear pins to be sheared, so that the wedge members are tightened around the shaft core of the rotating drum. Accordingly, the winding shaft 32 is rapidly rotated in the direction of winding a webbing to thereby securely restrain a vehicle passenger by the webbing.

Conversely, when the webbing retractor 10 is removed from the side wall 14 of the vehicle body, the webbing retractor 10 is removed in the reverse order of the installation. Namely, the garnish 36 is first removed from the side wall 14 of the vehicle body. Accordingly, i.e., by removing the garnish 36 from the side wall 14 of the vehicle body, the operator can determine visually the position of the lever 40 in an operation-released state and can easily determine that the sensor is in a detecting state. Next, the mounting bolts 22, 48 are removed from the weld nuts 20, 46, respectively, so as to remove the webbing retractor 10 from the side wall 14 of the vehicle body. However, at this time the lever 40 is in a vertical state. For this reason, the end portion 40A of the lever 40 causes the bolt-inserting through hole (a head portion of the mounting bolt 48) of the upper stay 42 to not be seen from the operator's side, so that the mounting bolt 48 cannot be removed. Accordingly, the operator needs to switch the lever 40 from a vertical state to a horizontal state. This results in that the sensor is switched from a detecting state to a non-detecting state. When the lever 40 is switched to a horizontal state, the mounting bolts 48, 22 are sequentially removed from the weld nuts 46, 20, respectively, in accordance with indications of the operational sequence. Thus, the operator can safely and reliably carry out removal of the webbing retractor 10.

As described above, the present embodiment is constructed such that the lever 40 interferes with the garnish 36 when the lever 40 is in a horizontal state (i.e., the safety device is in an operative state), so as to prevent mounting of the garnish 36, whereas the lever 40 is adapted to allow mounting of the garnish 36 when the lever 40 is in a vertical state (i.e., the safety device is in an operation-released state). Accordingly, the operator can easily determine whether the safety device is in an operative state or an operation-released state by means of the garnish 36.

Further, since the lever 40 is in a horizontal state (i.e., the safety device is in an operative state) when the webbing retractor 10 is mounted to the vehicle body, a jig such as an impact wrench may be used when the webbing retractor 10 is mounted to the side wall 14 of the vehicle body. As a result, mounting workability of the webbing retractor 10 to the side wall 14 of the vehicle body can be improved.

Next, a second embodiment of the present invention will be described below with reference to FIG. 2.

It should be noted that the same members as those of the first embodiment will be denoted by the same reference numerals, and a description thereof will be omitted.

Figure 2:
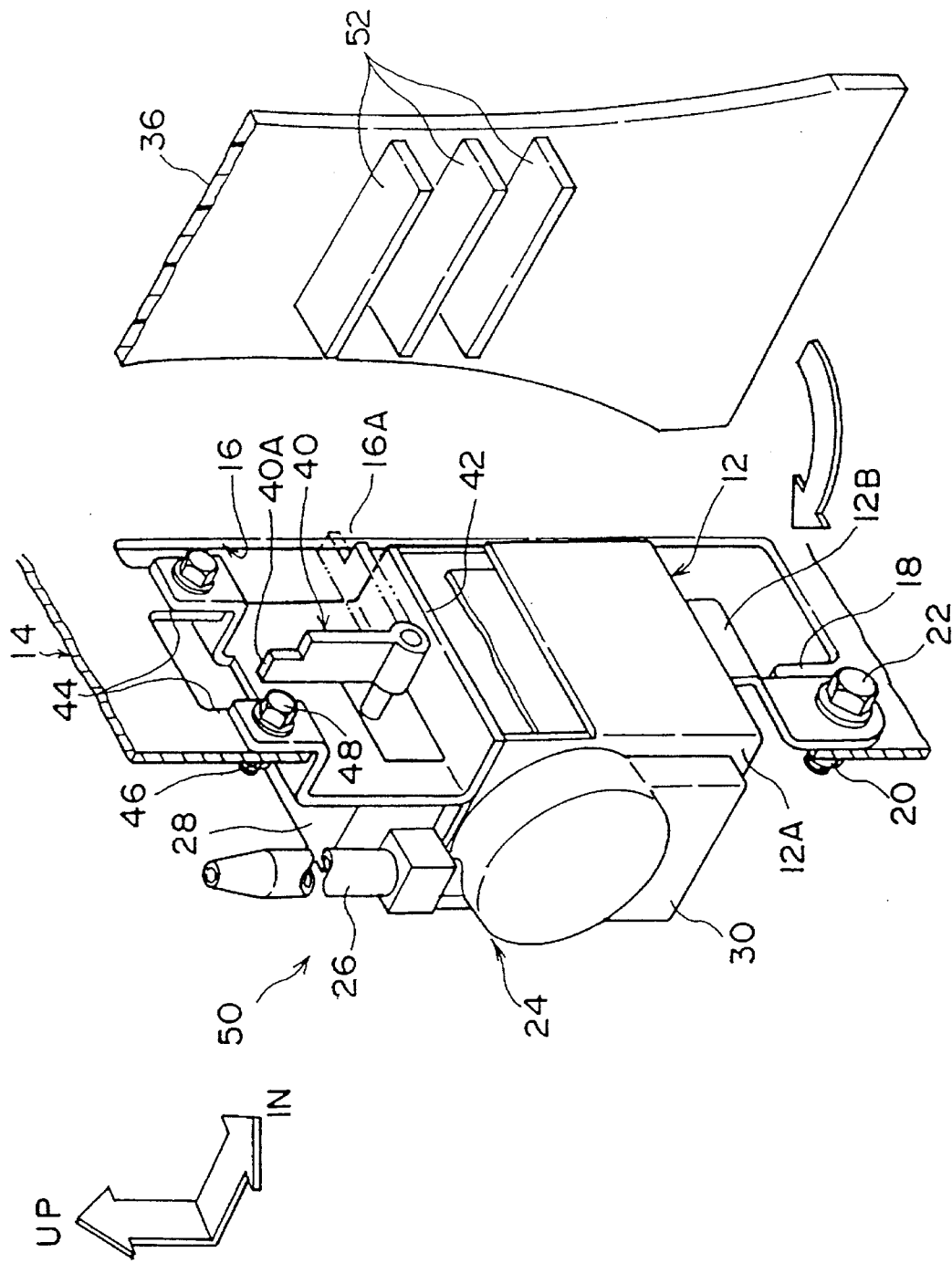
FIG. 2 is a perspective view illustrating a webbing retractor according to a second embodiment of the present invention.

As illustrated in FIG. 2, in a webbing retractor 50, the rotational direction surface of the lever 40 disposed at an interior side wall surface of the sensor-accommodating section 28 is offset by 90° with respect to that of the first embodiment. When the lever 40 is in a vertical state, the webbing retractor 10 can pass through the opening portion 16. When the lever is in a horizontal state, the end portion 40A of the lever 40 interferes with a side edge 16A of the opening portion 16, so that the webbing retractor cannot pass through the opening portion 16. Further, integrally formed on the surface of the garnish 36 at the outer side of the vehicle are three contact plates 52 opposing the lever 40. The contact plates 52 are arranged in parallel with each other from the top to the bottom of the garnish 36. Each interval of the contact plates 52 is made larger than the board thickness of the lever 40.

In the structure described above, the lever 40 is initially set in a vertical state prior to mounting of the webbing retractor 50. After that, the mounting operation of the garnish 36 is carried out. At this time, when the lever 40 is in a vertical state, the lever 40 interferes with the contact plates 52 of the garnish 36. For this reason, the operator can easily understand that the sensor is in a non-detecting state. Therefore, the operator first needs to switch the lever 40 from a vertical state to a horizontal state. This results in the sensor being switched from a non-detecting state to a detecting state. Further, in the aforementioned state, the lever 40 being disposed horizontally can be inserted between the contact plates 52, thereby allowing the garnish 36 to be mounted.

On the other hand, when the webbing retractor 50 is removed from the side wall 14 of the vehicle body, the garnish 36 is first removed from the side wall 14 of the vehicle body. Accordingly, i.e., by removing the garnish 36 from the side wall 14 of the vehicle body, the operator can visually determine that the position of the lever 40 is in an operation-released state and can easily know that the sensor is in a detecting state. Next, the removal of the webbing retractor 50 from the side wall 14 of the vehicle body is carried out. However, at this time, the end portion 40A of the lever 40 in a horizontal state interferes with the side edge 16A of the opening portion 16, so that the webbing retractor 50 cannot be removed from the side wall 14 of the vehicle body. For this reason, the operator first needs to switch the lever 40 from a horizontal state to a vertical state. As a result, the sensor is switched from a detecting state to a non-detecting state, thereby allowing the operator to safely and reliably remove the webbing retractor 50 from the side wall 14 of the vehicle body.

As described above, in this second embodiment as well, the operator can easily determine whether the safety device is in an operative state or in an operation-released state by means of the garnish 36.

Next, a third embodiment of the present invention will be described below with reference to FIG. 3.

It should be noted that the same members as those of the first and the second embodiments will be denoted by the same reference numerals, and a description thereof will be omitted.

A webbing retractor 60 according to the third embodiment is constructed in a manner similar to the second embodiment, in that a lever 62 serving as a safety device is not provided with a notch and when the lever 62 is in a vertical state so as to set the sensor in a detecting state (i.e., the safety device is in an operation-released state), the lever 62 is positioned at a rear side of a head portion of one mounting bolt 48. Accordingly, the mounting bolt 48 cannot be removed when the lever 62 is in a vertical state. Meanwhile, a plurality of contact plates 64 provided in the garnish 36 is disposed at a different angle from the contacts plates 52 of the second embodiment by 90°, so as to be fixed to the garnish 36 in a vertical direction. Accordingly, when the lever 62 is in a vertical state (i.e., the safety device is in an operation-released state), the lever 62 does not interfere with the contact plates 64 of the garnish 36, so that the installation of the garnish 36 can be achieved. However, when the lever 62 is in a horizontal state (i.e., the safety device is in an operative state), it interferes with the contact plates 64 of the garnish 36, so that installation of the garnish 36 cannot be achieved.

In the structure described above, when the lever 62 is in a vertical state, the mounting bolt cannot be tightened. Accordingly, the operator initially brings the lever 62 to a horizontal state prior to mounting the webbing retractor 60 to the side wall 14 of the vehicle body. Next, the mounting operation of the garnish 36 is carried out. At this time, when the lever 62 is in a horizontal state, the lever 62 interferes with the contact plates 64 of the garnish 36. For this reason, the operator can easily understand that the sensor is in a non-detecting state. Accordingly, the operator first needs to switch the lever 62 from a horizontal state to a vertical state. As a result, the sensor is switched from a non-detecting state to a detecting state. Further, in this state, the lever 62 disposed in a vertical state can be inserted between the contact plates 64, thereby allowing the installation of the garnish 36.

On the other hand, when the webbing retractor 60 is removed from the side wall 14 of the vehicle body, the garnish 36 is first removed from the side wall 14 of the vehicle body. Accordingly, i.e., by removing the garnish 36 from the side wall 14 of the vehicle body, the operator can visually determine that the position of the lever 62 is in an operation-released state and can easily know that the sensor is in a detecting state. Next, the removal operation of the webbing retractor 60 from the side wall 14 of the vehicle body is carried out. However, at this time, the lever 62 in a vertical state is positioned at a rear side of a head portion of the mounting bolt 48 and the mounting bolt 48 cannot be removed. For this reason, the operator needs to switch the lever 62 from a vertical state to a horizontal state, thereby resulting in that the sensor is switched from a detecting state to a non-detecting state. Accordingly, the operator can sequentially remove the mounting bolts 48, 22 from the weld nuts 46, 20, respectively, in accordance with indications of operating sequence and can safely and reliably remove the webbing retractor 60 from the side wall 14 of the vehicle body.

As described above, the present embodiment is constructed such that, when the lever 62 is in a horizontal state (i.e., the safety device is in an operative state), the lever 62 interferes with the contact plates 64 of the garnish 36, so as to prevent the installation of the garnish 36, and when the lever 62 is in a vertical state (i.e., the safety device is in an operation-released state), the lever 62 allows the installation of the garnish 56. Accordingly, the operator can easily determine whether the safety device is in an operative state or in an operation-released state by means of the garnish 56.

Further, since the lever 62 is in a horizontal state (i.e., the safety device is in an operative state) when the webbing retractor 60 is installed, a jig such as an impact wrench may be used when the webbing retractor 60 is installed at the side wall 14 of the vehicle body. Accordingly, the mounting workability of the webbing retractor 60 to the side wall 14 of the vehicle body can be improved.

Namely, the third embodiment obtains the same effects as those of the first embodiment.

Meanwhile, in the foregoing, the garnish 36 is used as a vehicle component. However, the present invention is not limited to the same, and may be applied to any vehicle component that can be mounted after the mounting of the webbing retractor and can achieve regularity of the sequence of mounting and removing the webbing retractor 10 (or the webbing retractor 50) described above.

What is claimed is:

1. A preloader for a webbing retractor, comprising:

a sensor which detects a state in which a vehicle rapidly decelerates;

a safety device which can be selectively switched to one of an operative state in which said sensor is brought to a non-detecting state, and an operation-released state in which said sensor is brought to a detecting state, said safety device being cooperative with a vehicle component to indicate a condition of said webbing retractor with respect to the vehicle, said safety device interfering with a plurality of projections which are provided as part of the vehicle component to be mounted after installation of said webbing retractor to a vehicle body in said operative state so as to prevent said vehicle component from being mounted to the vehicle body in said operation state of said safety device, and said safety device cooperating with said vehicle component so as to allow the mousing of the vehicle component onto the vehicle body only in said operation-released state.

2. A preloader for a webbing retractor, according to claim 1, wherein said safety device comprises a switching member for switching said safety device between the operative state and the operation-released state, said safety device causing said switching member to interfere with said vehicle component in said operative state, so as to prevent mounting of said vehicle component to the vehicle body, and allowing said vehicle component to be mounted to the vehicle body in said operation-released state.

3. A preloader for a webbing retractor, according to claim 2, wherein said switching member rotates between a position corresponding to said operative state and a position corresponding to said operation-released state so as to switch said safety device between said operative and said operation-released states.

4. A preloader for a webbing retractor, according to claim 3, wherein said switching member comprises an elongated lever member.

5. A preloader for a webbing retractor, according to claim 4, wherein said lever member is disposed such that the longitudinal direction thereof is perpendicular to the direction of the length of the vehicle body along a traveling direction of the vehicle, said lever member being adapted to project in a transverse direction of the vehicle in said operative state, so as to interfere with said vehicle component, and further adapted to be disposed such that the longitudinal direction thereof is in parallel with a vertical direction of the vehicle in said operation-released state, so as not to interfere with said vehicle component.

6. A preloader for a webbing retractor, according to claim 4, wherein said lever member is disposed such that the longitudinal direction thereof is perpendicular to the transverse direction of the vehicle body and is adapted to interfere with said vehicle component in said operative state and not to interfere with said vehicle component in said operation-released state.

7. A webbing retractor structure, comprising:

a winding shaft for winding a webbing in layered form;

a preloader which rapidly rotates said winding shaft in the direction of winding the webbing by a predetermined amount at the time of sudden deceleration of a vehicle; and a cover member mounted to a vehicle body after mounting of the webbing retractor to the vehicle body and covering the webbing retractor, wherein said preloader comprises a sensor which detects the state in which the vehicle rapidly decelerates and a safety device which can be selectively switched to one of an operative state in which said sensor is brought to a non-detecting state, and an operation-released state in which said sensor is brought to a detecting state, said safety device being cooperative with said cover member to indicate a condition allowing the safe assembly and dismantling of said webbing retractor with respect to the vehicle, said cover member having a plurality of projections which interferes with said safety device and said safety device interfering with said plurality of projections of said cover member in said operative state, so as to prevent said cover member from being mounted to the vehicle body, and cooperating with said cover member so as to allow the mounting of the vehicle component to the vehicle body only in said operation-released state.

8. A webbing retractor structure, according to claim 7, wherein said safety device comprises a switching member for switching said safety device between an operative state and an operation-released state, said safety device causing said switching member to interfere with said cover member in said operative state, so as to prevent said cover member from being mounted to the vehicle body, and allowing said cover member to be mounted to the vehicle body in said operation-released state.

9. A webbing retractor structure, according to claim 8, wherein said switching member rotates between a position corresponding to said operative state and a position corresponding to said operation-released state so as to switch said safety device between said operative and said operation-released states.

10. A webbing retractor structure, according to claim 9, wherein said switching member is an elongated lever member and said cover member is a plate-shaped member.

11. A webbing retractor structure, according to claim 10, wherein said lever member is disposed such that the longitudinal direction thereof is perpendicular to the direction of the length of the vehicle body along a traveling direction of the vehicle, said lever member being adapted to project in a transverse direction of the vehicle in said operative state, so as to interfere with said plate-shaped member, and further adapted such that the longitudinal direction thereof is parallel with a vertical direction of the vehicle in said operation-released state, so as not to interfere with said plate-shaped member.

12. A webbing retractor structure, according to claim 10, wherein said lever member is disposed such that the longitudinal direction thereof is perpendicular to the transverse direction of the vehicle body and said plurality of projections are provided at the side of the webbing retractor, said plurality of projections being adapted to not interfere with said lever member in said operation-released state.

13. A webbing retractor structure, according to claim 7, wherein said safety device in said operation-released state is disposed at a position which interferes with a portion in which said webbing retractor is mounted to the vehicle body, so as to prevent installation of said webbing retractor to the vehicle body.

14. A webbing retractor structure, comprising:

a winding shaft for winding a webbing in layered form;

a preloader which rapidly rotates said winding shaft in the direction of winding the webbing by a predetermined amount at the time of sudden deceleration of a vehicle; and a plate-shaped cover member mounted to a vehicle body after mounting of the webbing retractor to the vehicle body and covering the webbing retractor, wherein said preloader comprises a sensor which detects the state in which the vehicle rapidly decelerates and a safety device which can be selectively switched to one of an operative state in which said sensor is brought to a non-detecting state, and an operation-released state in which said sensor is brought to a detecting state, said safety device being cooperative with said plate-shaped cover member to indicate a condition of said webbing retractor with respect to the vehicle, and interfering with said plate-shaped cover member in said operative state so as to prevent said cover member from being mounted to the vehicle body, and cooperating with said cover member so as to allow the mounting of the vehicle component to the vehicle body only in said operation-released state, wherein said safety device includes a switching member formed from an elongated lever member for switching said device between an operative state and an operation-released state, said safety device causing said elongated lever member to interfere with said plate-shaped cover member in said operative state so as to prevent said cover member from being mounted to the vehicle body, and allowing said cover member to be mounted to the vehicle body in said operation-released state, said elongated lever member being rotatable between a position corresponding to said operative state and a position corresponding to said operation-released state so as to switch said device between said operative and said operation-released states, the longitudinal axis of the lever member being perpendicular to the transverse direction of the vehicle body, and a plurality of projections being provided at the side of the webbing retractor as part of said plate-shaped cover member for interfering with said lever member in said operative state.

* * * * *